United States Patent
So et al.

(10) Patent No.: US 8,335,154 B2
(45) Date of Patent: Dec. 18, 2012

(54) METHOD AND SYSTEM FOR PROVIDING FAULT DETECTION AND NOTIFICATION FOR COMPOSITE TRANSPORT GROUPS

(75) Inventors: Ning So, Plano, TX (US); Scott R. Kotrla, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 157 days.

(21) Appl. No.: 12/182,871

(22) Filed: Jul. 30, 2008

(65) Prior Publication Data

US 2010/0027415 A1    Feb. 4, 2010

(51) Int. Cl.
*G01R 31/08* (2006.01)
(52) U.S. Cl. .................... 370/225; 370/242
(58) Field of Classification Search .......... None
See application file for complete search history.

(56) References Cited

U.S. PATENT DOCUMENTS

| | | | |
|---|---|---|---|
| 6,973,229 B1 * | 12/2005 | Tzathas et al. | 385/16 |
| 7,197,008 B1 * | 3/2007 | Shabtay et al. | 370/218 |
| 7,230,924 B2 * | 6/2007 | Chiu et al. | 370/237 |
| 7,345,994 B2 * | 3/2008 | Sivabalan et al. | 370/228 |
| 7,406,032 B2 * | 7/2008 | Li et al. | 370/217 |
| 7,602,726 B1 * | 10/2009 | Sundaresan et al. | 370/237 |
| 2004/0085894 A1 * | 5/2004 | Wang et al. | 370/216 |
| 2005/0160171 A1 * | 7/2005 | Rabie et al. | 709/227 |
| 2009/0010171 A1 * | 1/2009 | Gupta et al. | 370/244 |
| 2009/0086754 A1 * | 4/2009 | Mack-Crane et al. | 370/466 |

* cited by examiner

*Primary Examiner* — Nittaya Juntima
*Assistant Examiner* — Rhonda Murphy (57) ABSTRACT

An approach is provided for fault detection and notification for a composite transport group (CTG). A component link of a CTG associated with a label switched path (LSP) is monitored. A fault is detected in the component link. It is determined whether traffic of the LSP can be transparently rerouted to another component link of the CTG based on resource availability of the other component link. The traffic is transparently rerouted to the other component link if resources are available. An upstream label switched node is notified if resources are unavailable.

20 Claims, 10 Drawing Sheets

METHOD AND SYSTEM FOR PROVIDING FAULT DETECTION AND NOTIFICATION FOR COMPOSITE TRANSPORT GROUPS

BACKGROUND INFORMATION

Telecommunication networks have developed from connection-oriented, circuit-switched (CO-CS) systems, such as the public switched telephone network (PSTN), utilizing constant bit-rate, predefined point-to-point connections to connectionless, packet-switched (CNLS) systems, such as the Internet, utilizing dynamically configured routes characterized by one or more communication channels divided into arbitrary numbers of variable bit-rate channels. With the increase in demand for broadband communications and services, telecommunication service providers are beginning to integrate long-distance, large-capacity optical communication networks with these traditional CO-CS and CNLS systems. To ensure high reliability, fault detection techniques are employed. Such techniques can be difficult to deploy in these optical systems, in part, because of the complex interplay of protocols across a mixture of interfaces and networks (which utilize various protocols). Typically, these optical communication networks utilize multiplexing transport techniques, such as time-division multiplexing (TDM), wavelength-division multiplexing (WDM), and the like, for transmitting information over optical fibers.

Therefore, there is a need for an approach that provides for effective and efficient fault detection and notification across multiple networks.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for fault detection and notification for composite transport groups are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although the various exemplary embodiments are described with respect to fault detection and notification for composite transport groups within multi-protocol label switching (MPLS) networks, it is contemplated that the various exemplary embodiments are also applicable to other equivalent technologies and transport networks.

Figure 1A:
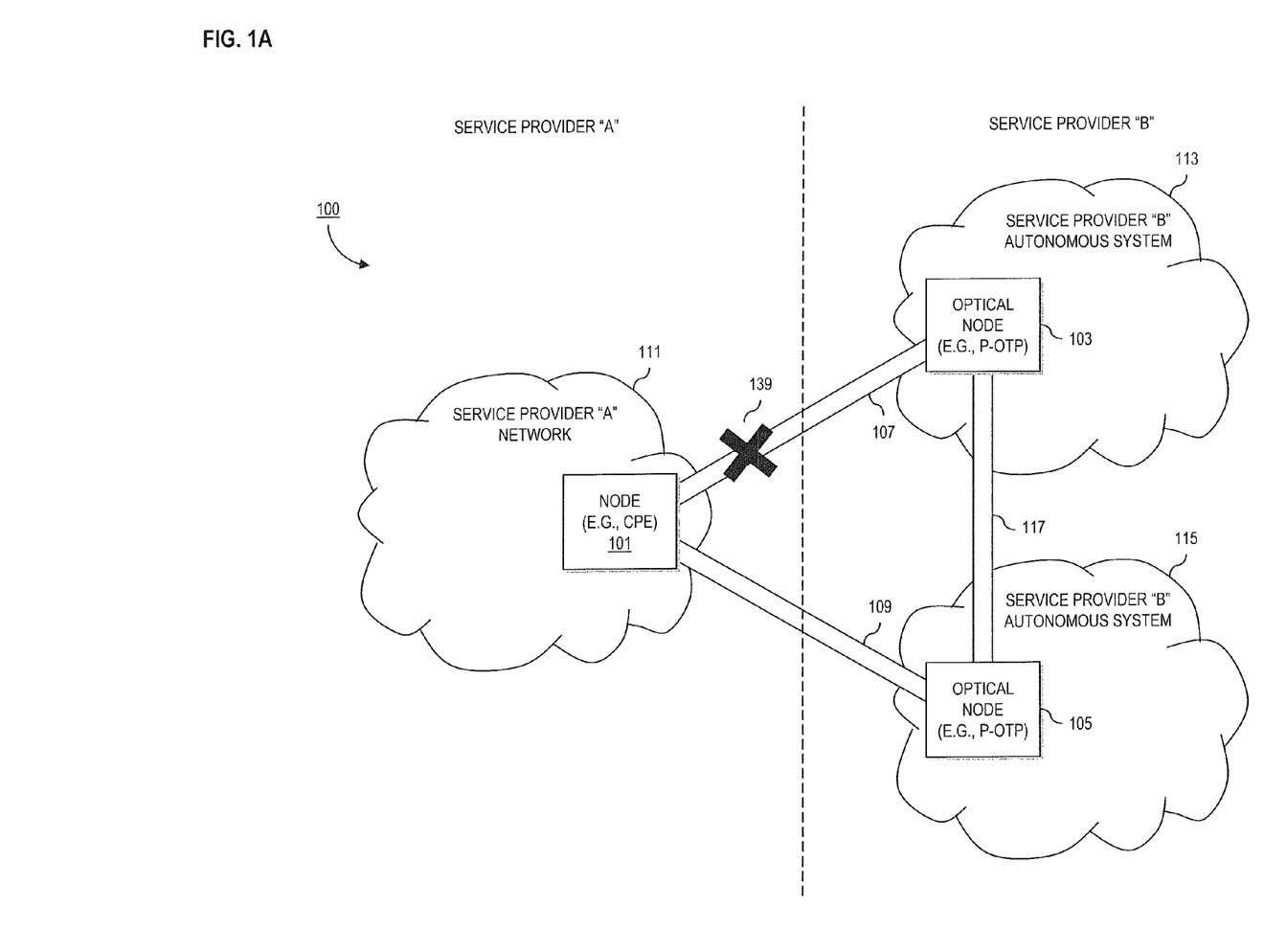
FIGS. 1A-1D are diagrams of systems configured to provide fault detection and notification for composite transport groups, according to an exemplary embodiment.

FIGS. 1A-1D are diagrams of systems configured to provide fault detection and notification for composite transport groups, according to an exemplary embodiment. For the purposes of illustration, a system 100, shown in FIG. 1A, provides fault detection and notification for composite transport groups (CTG) established between client nodes (e.g., node 101) and one or more optical nodes (e.g., optical nodes 103 and 105) within a packet-switched optical infrastructure, such as an MPLS infrastructure. By way of example, the system 100 encompasses networks of disparate service providers: service provider "A" and service provider "B." In this manner, optical links 107 and 109 may be considered "off-network" links (i.e., transport channels extending between network 111 of service provider "A" and autonomous systems (AS) 113 and 115 of service provider "B"), while optical link 117 may be considered an "on-network" link (i.e., a transport channel extending between AS 113 and 115 of service provider "B"). It is noted that in an alternative embodiment, AS 113 and 115 can be sub-networks of a single AS. In certain embodiments, client (subscriber or customer) node 101 is customer premise equipment (CPE) with optical nodes 103 and 105 under control of a service provider, which in this instance is service provider "B." Additionally, it is contemplated that node 101 can be owned by the service provider. While specific reference will be made thereto, it is contemplated that system 100 may embody many forms and include multiple and/or alternative components and facilities.

It is recognized that MPLS enables network administrators to control and manipulate the flow of traffic through a network. MPLS utilizes label switching techniques to construct label switched paths (LSP) on links interconnecting nodes of a network. Routing protocols, such as open-shortest path first (OSPF) and intermediate system to intermediate system (IS-IS), are utilized to determine LSP routes through the network, as well as govern the distribution of routing information between nodes of the network. OSPF and IS-IS utilize various attributes characterizing the links, such as available bandwidth, administration cost, etc., to determine LSP routes and, thereby, require nodes of the network to report (or announce) these characteristics concerning any directly connected links.

Although current routing techniques are robust and survivable, complex topologies of modern day networks make fault detection and notification increasingly onerous and inefficient. Composite transport groups (CTG), i.e., logical bundling of physical and/or logical links that are viewed by high layer routing and switching protocols as single logical interfaces, have been developed to lessen the complexity and burden by simplifying bandwidth management, improving bandwidth utilization, and delivering cost-effective protection schemes, as well as providing internal (or independent) operations administration maintenance (OAM) functionality for individual links. However, before CTGs can be widely adopted, adequate fault detection and notification techniques need to be developed.

Therefore, the approach of system 100, according to certain embodiments, stems from the recognition that provisioning CTGs in support of MPLS logically reduces the complexity of network topology, as well as reduces the fault detection and notification procedures that must be handled by the network. In turn, MPLS traffic engineering (TE) is enhanced and routing scalability is improved. This is because CTGs manage sets of "component connections" (i.e., logical channels) as "composite connections," as well as manage associations between client node instances and composite connections, which enable CTGs to dynamically distribute network traffic over the component connections transparently from the nodes transmitting and receiving a flow of traffic. In other words, CTGs, among other features, enable individual pathways to carry network traffic from multiple client nodes, maintain independent pathway transport availabilities and capacities, and provide for disparate transport rates, all the while enabling these individual pathways to provide pathway protection for one another as part of OAM procedures. Furthermore, provisioning CTGs in support of MPLS-TE only requires the CTGs to be announced as single TE pathways that are characterized by aggregate TE parameters, instead of having to individually report a multitude of component connections and their mass of associated TE parameters. Namely, when an LSP is established, only the aggregate CTG pathway need be identified, such that provisioning the LSP over the CTG becomes a local matter transparently resolved by the CTG, as opposed to the nodes transmitting and receiving the flow of traffic. Likewise, fault detection and notification can also be transparently resolved by the CTG before resorting to conventional MPLS detection, notification, and recovery solutions, such as MPLS rerouting techniques.

According to one embodiment, system 100 supports fault detection and notification for one or more CTGs established between a client node 101, such as a client device, router, switch, or any other suitable customer premise equipment (CPE) (or Provider Edge (PE)), and two or more optical nodes, (e.g., optical nodes 103 and 105), such as a reconfigurable optical add/drop multiplexer (ROADM), or other suitable optical transport platform (e.g., P-OTP (packet optical transport platform)). In exemplary embodiments, individual component links (or connections) forming a CTG are capable of maintaining their own OAM by, for example, monitoring connection "liveliness," i.e., operational connectivity and responsiveness between ingress and egress of the component link. Generally speaking, OAM is utilized for detecting and localizing network faults that hinder connection liveliness, as well as distribution of fault-related information (or notifications). As such, each layer of an infrastructure supporting a CTG may include its own OAM protocol. For instance, a CTG provisioned within an MPLS infrastructure may support various OAM protocols, such as one or more service layer OAMs and one or more transport layer OAMs. More specifically, OAM protocols may include asynchronous transfer mode (ATM) OAM, Ethernet OAM, MPLS OAM, synchronous optical networking/synchronous digital hierarchy (SONET/SDH) OAM, or any other suitable OAM protocol. The corollary is that, in exemplary embodiments, component link fault detection will be dependent upon the type of component link (e.g., ATM, Ethernet, SONET, etc.) and form (e.g., physical or logical) of component link being monitored for faults.

It is noted that CTGs of system 100 may be configured to support connection-oriented flows, e.g., network traffic embodying, for example, information packetized into one or more packets. Connectionless communications may also be encapsulated within connection-oriented connections. Thus, in exemplary embodiments, one CTG (or composite connection) may be established for transport of network traffic from client node 101 to optical node 103, and may include a first set (or bundle) of logical channels (or component connections), while another CTG may be established for transport of network traffic from client node 101 to optical node 105, and may include a second set of logical channels. The first set of logical channels may include a logical channel defined by optical link 107 (e.g., a primary channel) and a logical channel defined by the conjunction of optical links 109 and 117 (e.g., a secondary channel). The second set of logical channels may include a logical channel defined by optical link 109 (e.g., a primary channel) and a logical channel defined by the conjunction of optical links 107 and 117 (e.g., a secondary channel). It is contemplated; however, that logical channels may also be grouped in multiple CTGs.

Accordingly, network traffic may be provisioned to a CTG by mapping characteristics of the network traffic to characteristics of the component links of the CTG. The characteristics of the component links (i.e., CTG internal parameters), according to particular embodiments, may correspond to component link administrative costs (or TE metrics), physical bandwidths of the component links, connections (or pathways) on the component links consuming bandwidth, connection placement priorities, connection holding priorities, and/or connection over-subscription factors. In turn, aggregate characteristics (i.e., CTG external parameters) of the CTG may correspond to a CTG administrative cost utilized in shortest path computations, a CTG available bandwidth for supporting one or more LSPs on the CTG, and/or a maximum LSP bandwidth capable of being provisioned on the CTG. Based on one or more of the external characteristics, network traffic may be transparently routed over a CTG. That is, a pathway, such as a label switched pathway (LSP), may be established over the CTG by a transmitting node (e.g., client node 101) and a receiving node (e.g., node 103 or 105); however, the CTG may independently provision the pathway onto one or more component connections of the CTG, which is based on the CTG internal characteristics. In this manner, system 100 permits node 101 to treat CTGs as physical trunks, whereas the CTGs handle the routing of traffic on its own. CTGs may also transparently reroute network traffic from one component link to another, such as upon detection of a fault in a component link. Namely, CTGs also enable transparent fault recovery procedures. Such transparency preserves the configurations at node 101, as well as at optical nodes 103, 105. Accordingly, the use of CTGs can, for instance, save up to 50% access cost compared to traditional systems. CTGs can also save up to 50% on port costs. Furthermore, customer provisioning can be simplified at node 101 and traffic engineering (TE) can be more easily and efficiently applied. Placement and rerouting algorithms utilized by CTGs to transparently provision network traffic are disclosed in a co-pending patent application entitled, "Systems and Methods for Multi-Layer Interworking," U.S. application Ser. No. 12/039,845, filed on Feb. 29, 2008, which is incorporated herein, by reference, in its entirety.

As seen in FIG. 1, system 100 includes networks 111, 113, and 115, which include nodes 101, 103, and 105, respectively. In exemplary embodiments, system 100 is a connection-oriented transport environment, such as an MPLS infrastructure, having one or more optical links (e.g., optical links 107-109) established therein, wherein individual optical links embody optical fibers configured to carry data between two nodes, e.g., between nodes 101 and 103. It is noted that optical links 107, 109, and 117 may be automatically setup and torn down by means of any suitable signaling protocol, e.g., label distribution protocol (LDP), targeted LDP (TLDP), resource reservation protocol for traffic engineering (RSVP-TE), etc. Accordingly, optical links 107, 109, and 117 may carry information over various wavelengths or "channels." Routing protocols may include OSPF, IS-IS, border gateway protocol (BGP), interior gateway protocol (IGP), or any other suitable link-state or optimized link-state routing protocol.

Networks 113-115 may be any type of wired and/or wireless transport network, such as a local area network (LAN), metropolitan area network (MAN), wide area network (WAN), etc. At least a portion of networks 113-115 comply with the International Telecommunications Union—Telecommunication (ITU-T) standards recommendation working draft G.800 titled, "Unified Functional Architecture of Transport Networks," which is incorporated herein, by reference, in its entirety. Further, networks 113-115 may be configured to support MPLS-TE.

Client node 101 may be any suitable customer premise equipment, such as a computing device, router, switch, etc., while optical nodes 103 and 105 may be any suitable optical transport platform, such as a terminal multiplexor, a reconfigurable add/drop multiplexer, photonic switch, optical cross-connect with optical-electrical-optical conversion, synchronous optical networking cross-connect, signal regenerator, router, switch, or any other suitable optical networking interface, such as a packet optical transport platform.

Accordingly, information transport can occur between nodes 101-105 of networks 111-115 via optical links 107, 109, and 117, which represent channels (or paths) along which packets may be transported. A topology of system 100 can be characterized via optical links 107, 109, and 117, which further characterize the available transport capacity (e.g., bandwidth capacity) between nodes 101-105 of networks 113-115. During optical link configuration, optical links 107, 109, and 117 may be established and grouped into one or more CTGs for provisioning network traffic among and between nodes 101-105. As such, CTGs give nodes 101-105 the property of adjacency when viewed by higher layer networking protocols, such as OSPF, IS-IS, etc. Additionally, optical links 107, 109, and 117 can maintain their own OAM.

Furthermore, the CTGs may be provisioned onto one or more LSPs within an MPLS infrastructure. As is well known, LSPs between a source (or ingress) node and a destination (or egress) node may be determined at the source node, such that the nodes along the LSP are informed of a "next" node in the LSP through a message transmitted by the source node to each "next" node of the LSP. Each node in the LSP can associate a label with an output mapping for routing traffic to a "next" node in the LSP. An overview of MPLS is provided in R. Callon, et al., "A Framework for Multiprotocol Label Switching," IETF Internet Draft, September 1999, available at http://tools.ietf.org/html/draft-ietf-mpls-framework-05, and an exemplary MPLS architecture is provided in E. Rosen et al., "Multiprotocol Label Switching Architecture," IETF RFC 3031, January 2001, available at http://www.ietf.org/rfc/rfc3031.txt, which are incorporated herein, by reference, in their entireties. To provision a CTG as part of an LSP, the source node of the LSP need only provide a message to the CTG source node. In this manner, the CTG source node can transparently place the LSP onto one or more component links of the CTG utilizing the aforementioned placement and routing algorithms disclosed in the co-pending patent application entitled, "Systems and Methods for Multi-Layer Interworking." More background information concerning CTGs is provided below in conjunction with FIGS. 2-4.

Figure 1B:
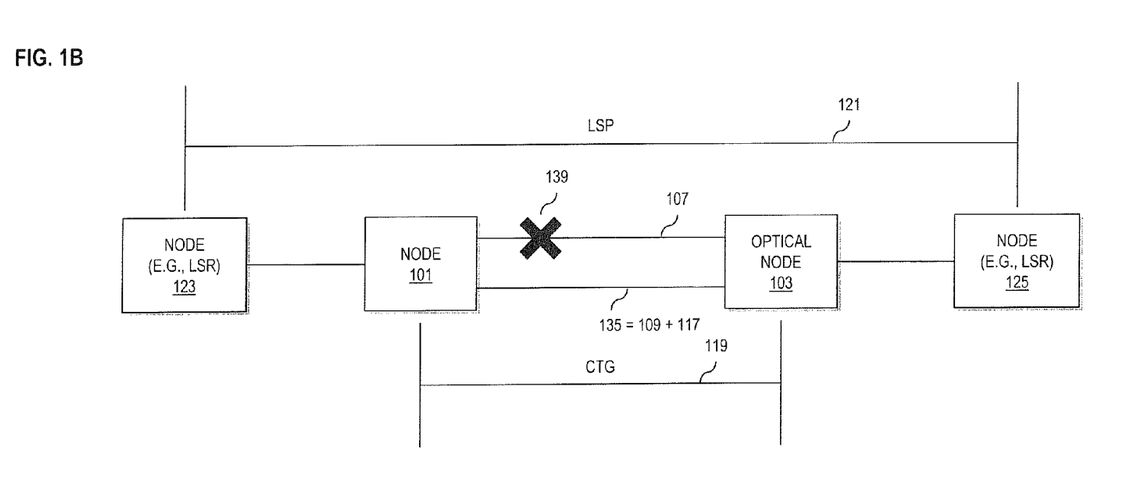
Figure 1C:
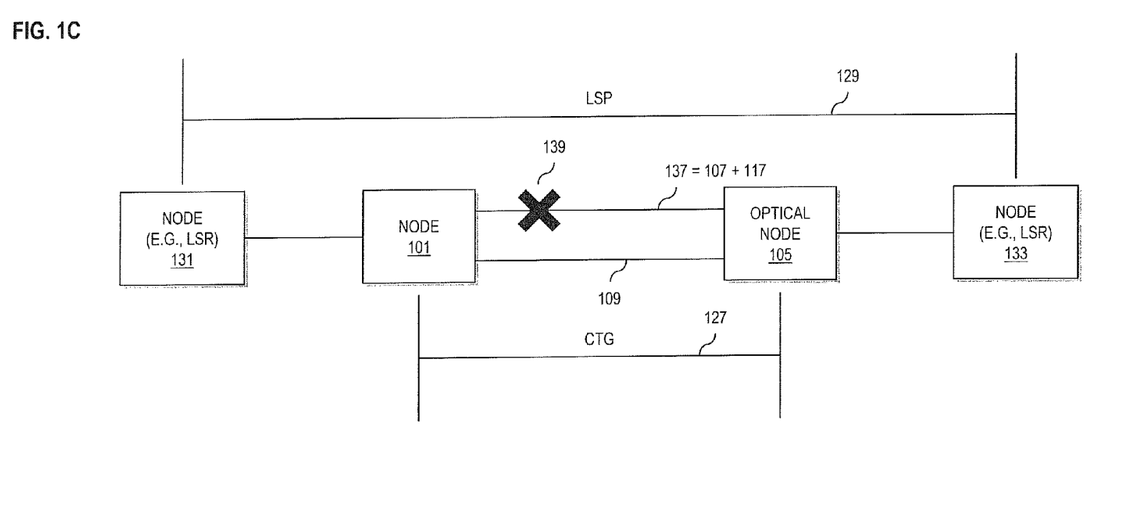

FIGS. 1B and 1C are exemplary diagrams of label switched paths of system 100. For descriptive purposes, the illustrated CTGs correspond to the previously described CTGs. That is, the first aforementioned CTG (i.e., CTG 119) may be provisioned onto LSP 121 established between nodes 123 and 125, while the second aforementioned CTG (i.e., CTG 127) may be provisioned onto LSP 129 between nodes 131 and 133. In this example, nodes 123, 125, 131, and 133 are label switched routers (LSR) of an MPLS infrastructure. It is noted that CTGs 119 and 127 include component links 107, 109, 135, and 137. Component links 107 and 109 are physical component links respectively characterized by optical links 107 and 109. Component links 135 and 137 are logical component links respectively characterized by the conjunction of optical links 109 and 117, and the conjunction of optical links 107 and 117. For clarification, when component links 107, 109, 135, and 137 are provisioned to CTGs 119 and 127, each may be considered a logical channel even though component links 107 and 109 represent physical links and not logical pathways (which are provided by component links 135 and 137).

Nevertheless, based on the establishment of CTGs 119 and 127, operation of fault detection and notification can be implemented by CTGs 119 and 127 (i.e., by nodes 101-105), utilizing "internal" fault detection and notification techniques. More specifically, internal fault detection and notification is performed by CTGs 119 and 127 transparently from LSPs 121 and 129. That is, the CTG source and destination nodes (i.e., nodes 101-105) of component links 107, 109, 135, and 137 detect faults (e.g., fault 139) themselves, and "internally" notify the CTG source node (e.g., node 101) to transparently perform fault recovery without notifying surrounding LSRs 123, 125, 131, 133 of LSPs 121 and 129. The notification is considered "internal" because it is provided to an entity internal to and, thereby, a part of the CTG. By way of example, upon detection of fault 139, component link 107 of CTG 119 informs CTG source node 101 of fault 119 so that CTG source node 101 can transparently recover from fault 139, such as by rerouting network traffic onto one or more "other" component links of CTG 119, e.g., component link 135. In this manner, the "upstream" and/or "downstream" nodes of LSP 121 need not monitor CTG 119 for faults or be informed of fault conditions. However, if CTG 119 cannot recover from fault 139, i.e., network traffic cannot be rerouted onto one or more "other" component links of CTG 119, CTG 119 (more specifically, CTG source node 101) can "externally" notify an "upstream" LSP node (e.g., node 123) so that the "upstream" LSP node can perform fault recovery, e.g., reroute network traffic around CTG 119. It is noted that the "upstream" LSP node may be an LSP source node (e.g., node 123) or an intermediary node (not shown) of the LSP between the LSP source node and the CTG source node (e.g., node 101), such as in a "crank back" rerouting scenario. Accordingly, the notification is considered "external" because it is provided to an entity external to and, thereby, apart from the CTG.

Moreover, faults (e.g., fault 139) may occur in either a physical component link (e.g., component link 107) or in a logical component link (e.g., component link 137). As such, operation of fault detection and notification can be made dependent upon the form (i.e., physical or logical) of the component link in which a fault is detected. Furthermore, because CTGs can support component links of various types (e.g., Ethernet, SONET/SDH, etc.), operation of fault detection and notification can also be made dependent upon the type of component link in which a fault is detected. Moreover, because component links can be provisioned as part of multiple CTGs (such as component link 107 of CTGs 119 and 127) and provisioned as different forms (e.g., component link 107 is a physical link in CTG 119 and part of a logical component link in CTG 127), varied fault detection and notification schemas can be simultaneously implemented.

Figure 1D:
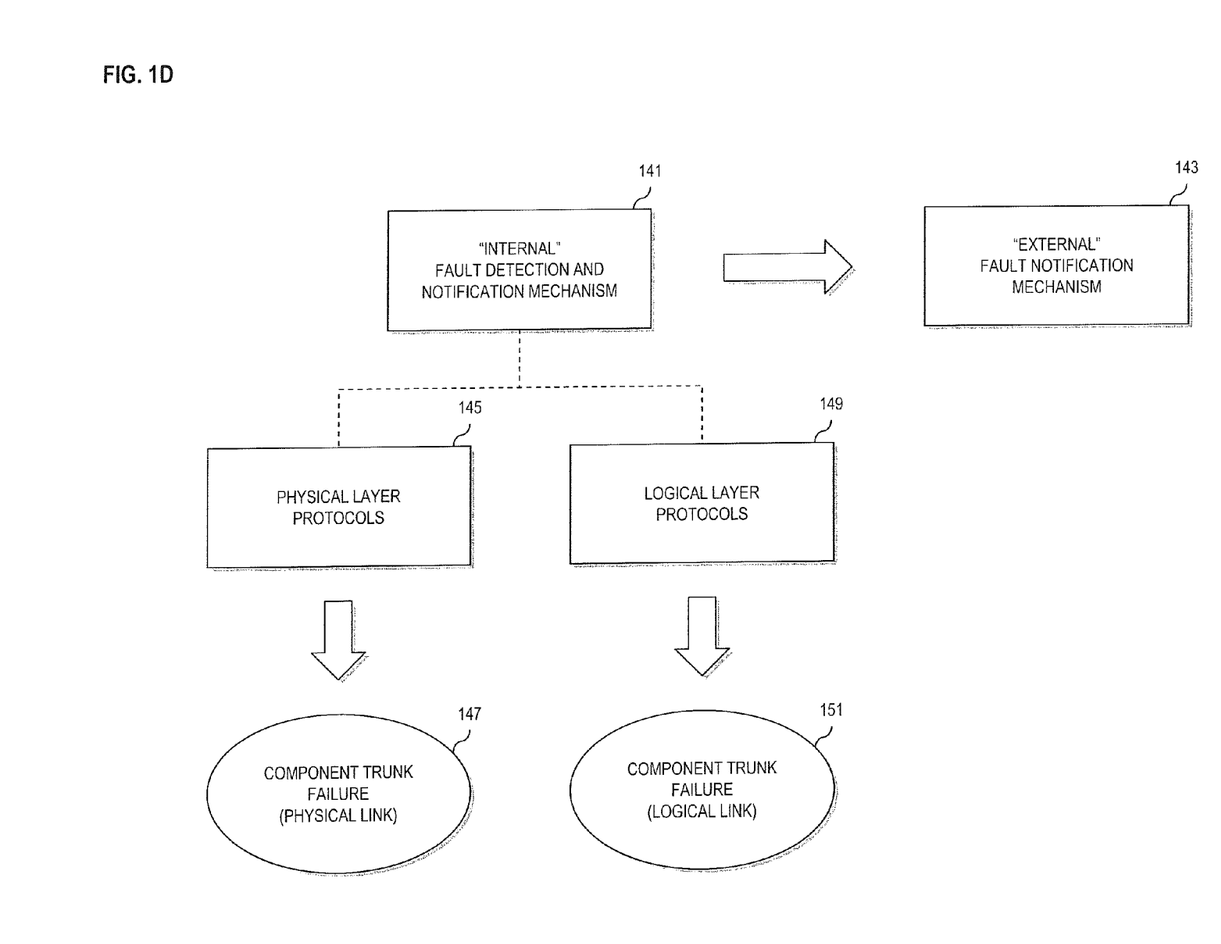

FIG. 1D is an operational diagram for fault detection and notification within a composite transport group, according to an exemplary embodiment. In this example, a CTG can include a mechanism 141 that is configured to execute "internal" fault detection and notification techniques, as well as a mechanism 143 that is configured to execute "external" fault notification procedures. Mechanisms 141 and 143 can be implemented on, for instance, the ingress and egress nodes of a CTG, such as nodes 101-105. Implementation of mechanisms 141 and 143 are described in more detail in accordance with FIGS. 5 and 6.

According to exemplary embodiments, mechanism 141 utilizes one or more physical layer protocols 145 to detect physical component link faults 147, and one or more logical layer protocols 149 to detect logical component link faults 151. It is contemplated that logical layer protocols 149 may also be utilized to detect physical component link faults 147. Physical layer protocols 145 include fault detection protocols that operate according to a "break" (or loss of connectivity) in the physical medium of a component link, such as a loss of connectivity in an Ethernet component link, a SONET/SDH component link, etc. For example, node 101 of CTG 119 may detect fault 139 within component link 107 via a loss of signal (LOS), loss of frame (LOF), or excessive bit error rate (E-BER) detection at the physical layer of component link 107, assuming component link 107 is a SONET/SDH component link. In another example, node 101 may detect fault 139 within component link 107 via a signal failure (SF) detection at the physical layer of component link 107, assuming component link 107 is an Ethernet component link.

Furthermore, logical layer protocols 149 include fault detection protocols that operate by establishing a fault detection session (or path) and, thereby, exchanging identifier information (e.g., fault detection units, such as blocks, cells frames, packets, etc.) between the ingress and egress points of a component link. When the identifier information "stops" being received, a fault is detected on the component link. For instance, a bidirectional forwarding detection (BFD) session may be establish and implemented between ingress and egress points of a CTG. In this manner, the BFD session may be either dynamically or permanently established on the component links of a CTG utilizing one or more of the aforementioned routing protocols, e.g., OSPF, IS-IS, etc. Once a BFD session is established for the component links, BFD identifier information may be transmitted along the component links. It is noted that the BFD identifier information can be carried as the "payload" of transmitted fault detection packets. As such, the versatility of BFD lies in the ability to encapsulate the fault detection packets in any suitable protocol appropriate for the transmission medium, i.e., the type and form of component link that the fault detection packet will traverse. That is, the fault detection packet may be encapsulated for transmission on both physical and logical component links, as well as on Ethernet, SONET/SDH, or any other suitable type of component link. Accordingly, the fault detection packets are transmitted, either periodically or in an on-demand fashion, along the component links of the CTG, such that when the exchange of the fault detection packets between the ingress and egress points of a particular component link stop for some predetermined time interval, a fault (such as fault 139) is detected on the particular component link. As such, a component link can be declared operational (or live) when two-way communication is established between the ingress and egress points of a component link and, thereby, not operational when two-way communication is thwarted. A general overview of BFD is provided in D. Katz and D. Ward, "Bidirectional Forwarding Detection," IETF Internet Draft, March 2008, available at http://www.ietf.org/internet-drafts/draft-ietf-bfd-base-08.txt.

Figure 5:
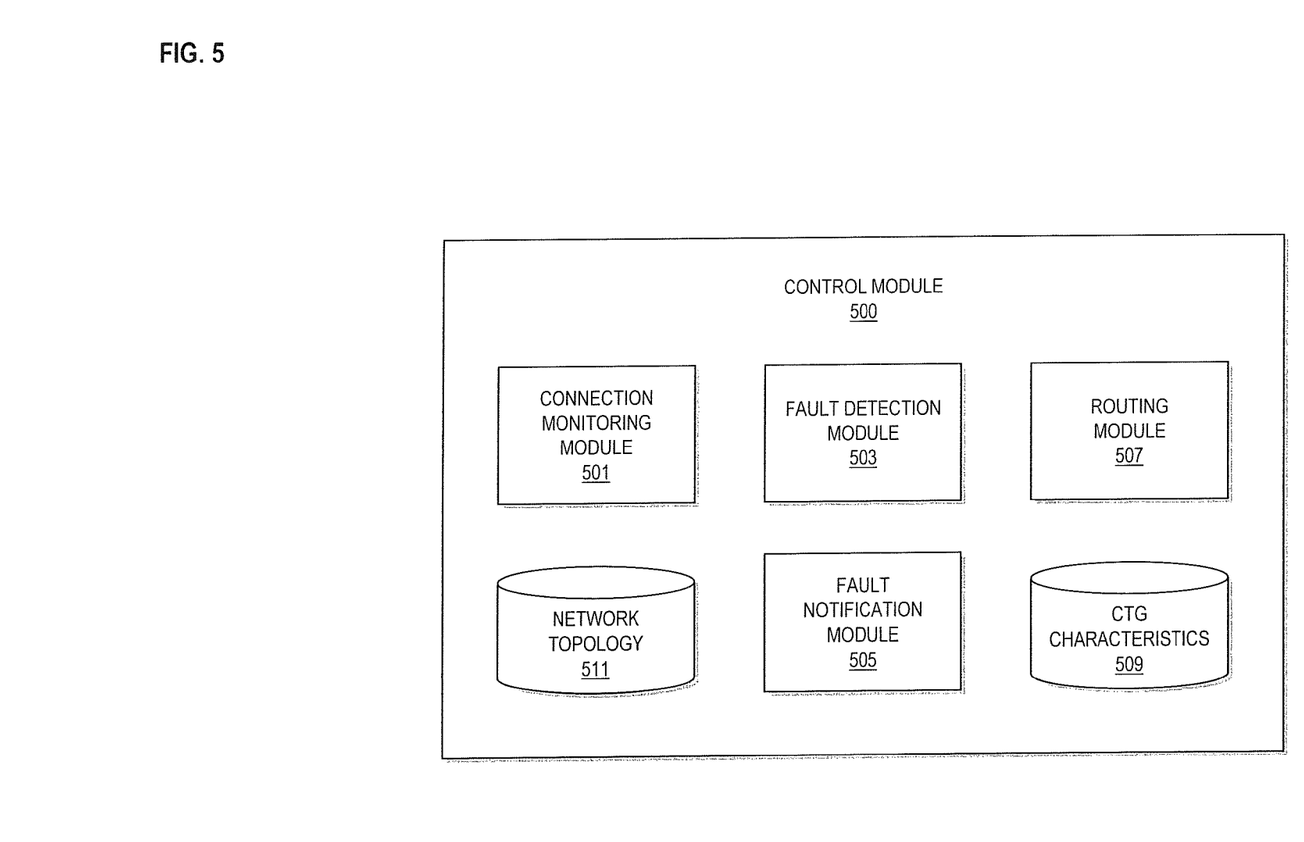
FIG. 5 is a diagram of a control module capable of providing fault detection and notification, according to an exemplary embodiment.

As will be explained in FIGS. 5 and 6, "internal" fault detection provided by mechanism 141 triggers "internal" notification by mechanism 141 to the ingress point of a CTG, which attempts to recover from the fault via, for example, rerouting network traffic to one or more of the remaining operational component links of the CTG. An "internal" notification may be transmitted from an egress node of the CTG to an ingress node of the CTG, or may be generated and, thereby, utilized by the ingress node. As previously mentioned, the CTG ingress node utilizes the aforementioned placement and routing algorithms disclosed in the co-pending patent application entitled, "Systems and Methods for Multi-Layer Interworking," to attempt to provision the network traffic onto one or more of the remaining, operational component links. If, however, the CTG ingress node cannot provision the network traffic onto one or more of the remaining, operational component links, i.e., the remaining component links do not have resources (e.g., available bandwidth, priority, etc.) to host the network traffic, then mechanism 143 provides "external" notification to the nodes "upstream" from the faulted CTG, such as nodes 123 and 131. The external notification (i.e., a release message utilized to tear down the traffic pathway to the faulted CTG) may be signaled to the "upstream" nodes utilizing any suitable signaling protocol, e.g., resource reservation protocol (RSVP), label distribution protocol (LDP), etc. A tear down message removes the output mappings (i.e., established routing labels for identifying a "next" hop node) within the routing tables of the nodes along an established pathway, i.e., along an established LSP. In this manner, mechanism 143 initiates an LSP tear down and, thereby, enables "upstream" nodes of the LSP to reroute network traffic around a faulted CTG.

To better appreciate the above approach, it is instructive to describe the structure and establishment of a CTG.

Figure 2:
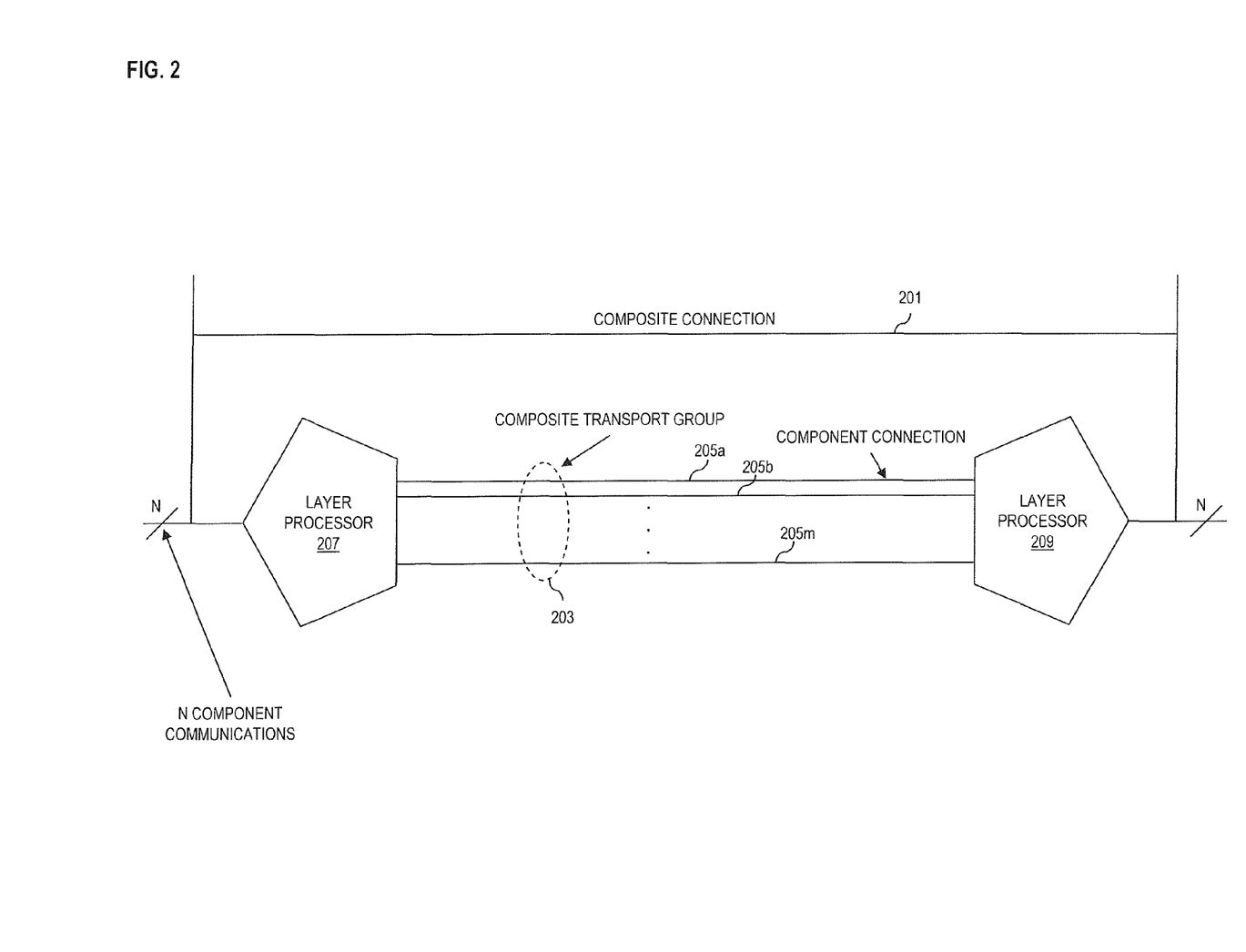
FIG. 2 is a diagram of a composite transport group, according to an exemplary embodiment.

FIG. 2 is a diagram of a composite transport group, according to an exemplary embodiment. As shown, composite connection 201 is made available via CTG 203, which includes one or more parallel component connections (e.g., physical and/or logical links), e.g., component connections 205a-205m, sharing similar ingress and egress points. Accordingly to one embodiment, CTG 203 ingress and egress points correspond to nodes 101-105. For instance, node O1 may be an ingress point of two CTGs, while nodes 103 and 105 may be respective egress points of the two CTGs. Additionally, nodes 103 and 105 may embody "net hop" nodes on a path of the CTGs, i.e., on a path of a component connection of a CTG.

From the perspective of CTG 203, each component connection 205a-205m acts as an independent transportation entity, and therefore, enables independent transportation path availabilities (e.g., physical and/or available bandwidths) for composite connection 201 for network traffic. That is, if network traffic is sequenced at an ingress point and transported over one or more component connections (e.g., component connections 205a-205m), then the network traffic may or may not arrive at an egress point in the same sequential order. Thus, when information is transported via composite connection 201 utilizing CTG 203, a layer processor (LP) at the ingress (e.g., LP 207) distinguishes component connections 205a-205m by processing each packet and distributing the packets over composite connection 201 via one or more of component connections 205a-205m. The ability of LP 207 to distinguish between component connections 205a-205m is dependent upon packet header format and information encoded therein, such as one or more labels for label-switch routing. Thus, LP 207 routes network traffic transparently from the entities attempting to transport and receive the traffic. In this manner, a network gains transport scalability via composite connection 201 because individual component connections can be independently added, removed, and/or resolved by CTG 203, and since the transportation entities are only privy to the fact that composite connection 301, as a whole, is operational, the configuration of the transportation entities need not be affected. Accordingly, component connections 205a-205m may also support independent OAM, wherein fault detection is performed based on a type of component connection (e.g., Ethernet, SONET, etc.) and form of component connection (e.g., physical or logical) being monitored.

Thus, composite connection 201 made available via CTG 203 can be applied in both connection-less packet-switched (CL-PS) optical networks, as well as in connection-oriented packet-switched (CO-PS) optical networks. In CL-PS environments, component connections 205a-205m can exist as point-to-point links between autonomous systems (e.g., autonomous systems 113 and 115). Optical nodes 103 and 105 utilize information encoded in packet headers provided by, for example, client nodes (e.g., node 101) to distinguish between client communications. That is, a processing entity (or control interface) of optical nodes 103 and 105 utilize this information to differentiate between component connections (e.g., component connections 205a-205m) and distribute network traffic over one or more CTGs (e.g., CTG 203). Thus, network traffic transported via CTG 203 is "seen" by client nodes (e.g., node 101) as "belonging" to composite connection 201, as opposed to the particular component connection 205a-205m "actually" supporting the flow of network traffic.

In CO-PS environments, component connections 205a-205m of CTG 203 can be configured as point-to-point links, as above, or as point-to-point paths. Paths may be established over one or more optical links (e.g., optical links 107, 109, and/or 117) and, thereby, traverse one or more nodes (e.g., nodes 101-105). For composite connection 201 to support multiple communications from client nodes (e.g., node 101) information may be encoded within individual packet headers to differentiate between communications. Accordingly, at composite connection 201 ingress, LP 207 can use this information to distribute packets over component connections 205a-205m, which enables multiple composite connections 201 to be configured over a CTG, such as CTG 203. Further, LP 207 may, when determining which component connection to utilize to support transport, use this information to perform traffic engineering and routing processes, e.g., to assign resource capacity or priority for individual communications. In particular embodiments, this information may be acquired from a network administrator or network management system (not shown), as opposed to the packet headers. Thus, a composite connection 201 may be traffic engineered and monitored for faults on a per component connection basis, as well as traffic engineered based on component connection attributes, e.g., bandwidth capability, operational status, oversubscription, and the like, or node 101 attributes, e.g., allocated capacity, priority, origination address, destination address, etc.

Figure 3:
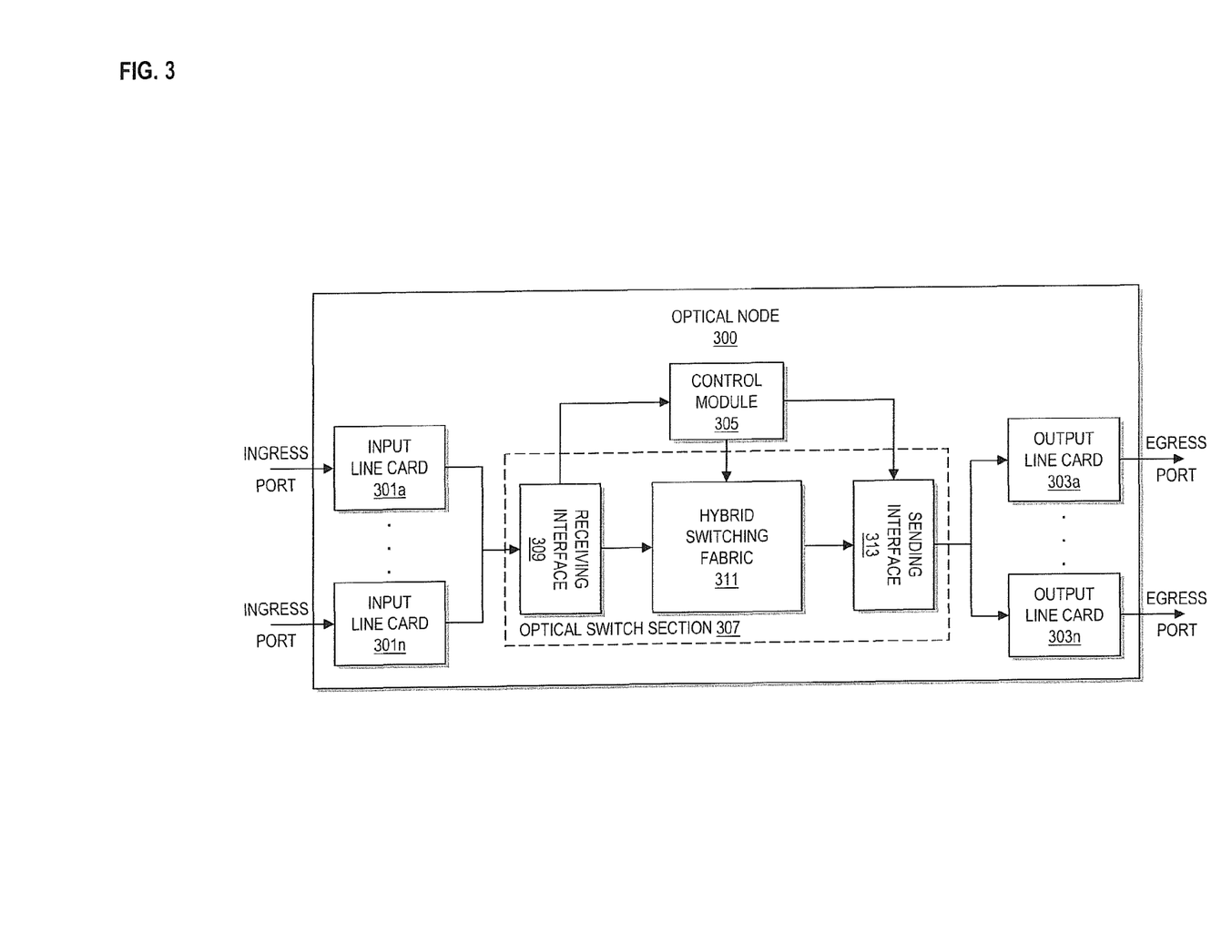
FIG. 3 is a diagram of an optical node configured to provide composite transport groups, according to an exemplary embodiment.

FIG. 3 is a diagram of an optical node configured to provide composite transport groups, according to an exemplary embodiment. For descriptive purposes, optical node 300 is described with respect to pac(et switching; however, may include functionality for optical burst switching, time division multiplexing (TDM), wavelength-division multiplexing (WDM), or any other suitable signal transfer schemes. As shown, optical node 300 includes input line cards 301a-301n, output line cards 303a-303n, control interface 305, and optical switch section 307; however, it is contemplated that optical node 300 may embody many forms. For example, optical node 300 may comprise computing hardware (such as described with respect to FIG. 7), as well as include one or more components configured to execute the processes described herein for fault detection and notification of a CTG supported by optical node 300. Furthermore, it is contemplated that the components of optical node 300 may be combined, located in separate structures, or separate physical locations. In other words, a specific topology is not critical to embodiments of optical node 300 or system 100 for that matter.

According to one embodiment, input line cards 301a-301n act as "n" input interfaces (ingress points) to optical node 300 from "n" transmitting sources (e.g., node 101), while output line cards 303a-303n act as "n" output interfaces (egress points) from optical node 300 to "n" destination nodes (e.g., optical nodes 103 and 105). When packets arrive at optical node 300, input line cards 301 a-301n port packets to receiving interface 309 of optical switch section 307. Receiving interface 309 separates headers and payloads from individual packets. Header information is provided to control interface 305 for routing purposes, while payloads are switched to destination output line cards 303a-303b via hybrid switching fabric 311 and sending interface 313. That is, hybrid switching fabric 311 routes payloads to appropriate pathways on sending interface 313, whereby updated headers are combined with switched payloads. The combination is output to destination nodes via output line cards 303a-303n.

In particular implementations, control interface 305 is configured to provision one or more logical channels through hybrid switching fabric 311 based on system 100 topological information. These logical channels can be grouped into one or more CTGs. According to one embodiment, control interface 305 establishes the aforementioned CTGs for transport of network traffic from client node 101 to optical node 103, and from client node 101 to optical node 105.

Figure 4:
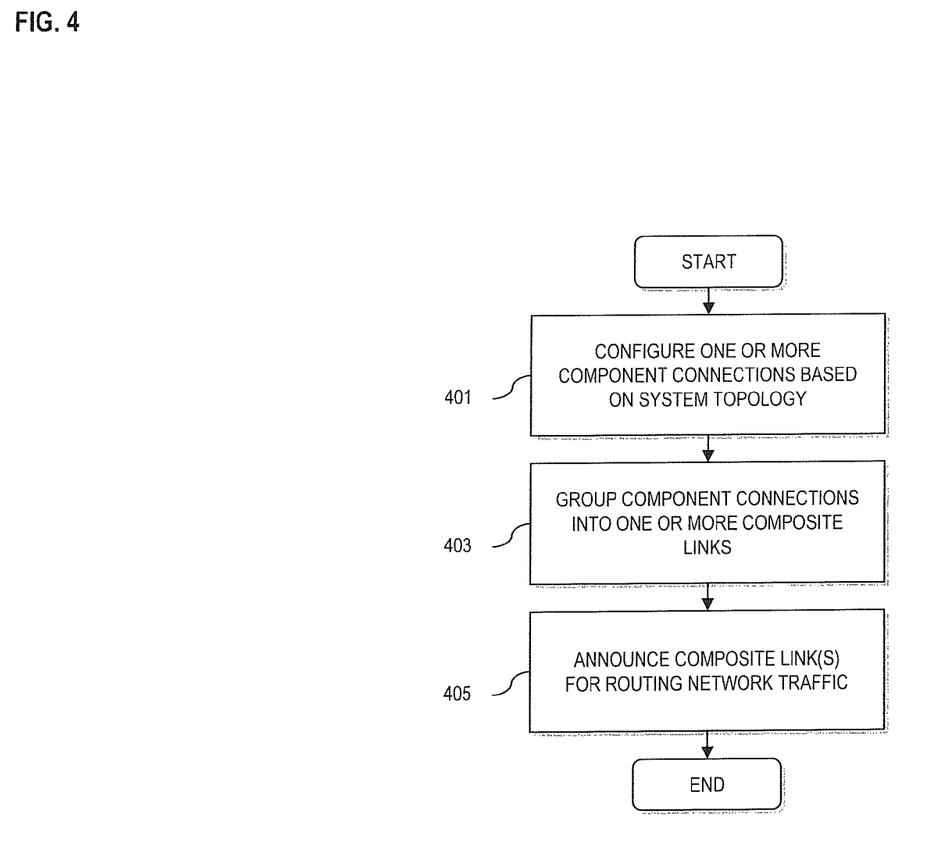
FIG. 4 is a flowchart of a process for establishing a composite transport group, according to an exemplary embodiment.

FIG. 4 is a flowchart of a process for establishing a composite transport group, according to an exemplary embodiment. For illustrative purposes, the process is described with reference to FIGS. 1 and 2. It is noted that the process assumes the existence of one or more previously established (or constructed) physical connections (e.g., optical links 107, 109, and 117) configured to transport network traffic, such as user information or network control information. The steps of the process may be performed in any suitable order or combined in any suitable manner.

At step 401, one or more optical nodes (e.g., optical nodes 103 and 105) configure one or more component connections (i.e., logical channels) based on a topology of system 100, i.e., based on the establishment of one or more physical connections (e.g., optical links 107, 109, and 117). Individual component connections may be configured over an optical link (e.g., optical link 107) or over a group of optical links (i.e., a path), such as a path defined by optical links 109 and 117. In this manner, component connections are independent channels configured for transporting information, wherein each component connection is individually characterized by its own transport availability, i.e., existence, administrative cost, physical bandwidth, provisioned bandwidth, operational status, placement priority, holding priority, and the like, as well as individually characterized by its own OAM. Thus, in step 403, various component connections may be grouped into one or more CTGs, such that any given CTG (e.g., CTG 203) includes several parallel component connections (e.g., component connections 205a-205m) establishing a transport route from a desired point "A," e.g., node 101, to a desired point "B," e.g., optical node 103. For example, system 100 may be characterized by two CTGs, e.g., one CTG may embody optical link 107 (i.e., a physical component connection) and the conjunction of optical links 109 and 117 (i.e., a logical component connection or a path), and the second CTG may embody optical link 109 and the conjunction of optical links 107 and 117. The characteristics of a composite connection (or CTG) may be stored to a memory (not shown) of, for example, optical nodes 103 and 105 and/or any other suitably accessible repository (not shown) of system 100.

According to one embodiment, the CTG characteristics may be stored to one or more tables that provide network traffic visibility so as to enable optical nodes 300 the ability to maximize and efficiently allocate available bandwidth among various information transporting nodes, e.g., node 101, based on, for instance, composite connection characteristics determined based on and using component connection characteristics. The aforementioned placement and rerouting algorithms may be utilized for allocating traffic. In essence, CTG characteristics aid in the design, implementation, and maintenance of quality of service by providing knowledge of one or more traffic instances. Thus, once one or more composite connections are established, the composite connections may be announced to the network for engineering traffic onto the composite connections(s), per step 405. That is, network traffic, such as packetized optical signals, may be transported over one or more component connections (e.g., component connection 205a-205m), which are defined by one or more optical links (e.g., optical links 107, 109, and 117) based on CTG announcement.

Referring to FIG. 3, control module 305 may also be configured for fault detection and notification. This enables optical node 300 to deliver more reliable service to customers. FIG. 5 is a diagram of a control module configured for fault detection and notification for composite transport groups, according to an exemplary embodiment. In this example, control module 500 implements mechanisms 141 and 143 of FIG. 1D, and includes connection monitoring module 501, fault detection module 503, notification module 505, and routing module 507, as well as CTG characteristics repository 509 and network topology repository 511; however, it is contemplated that control module 500 may embody many forms. For example, control module 500 may comprise computing hardware (such as described with respect to FIG. 7), as well as include one or more components configured to execute the processes described herein. It is contemplated that that the components of control model 500 may be combined, located in separate structures, or separate physical locations.

In exemplary embodiments, connection monitoring module 501 is configured to monitor one or more component connections (e.g., component connections 205a-205m) of a CTG (e.g., CTG 203). Monitoring may be performed at either ingress or egress of individual component connections, e.g., ingress and egress points of, for example, CTG 203, as well as at either the physical or logical layer. For instance, fault monitoring (or fault detection) units (e.g., cells, blocks, frames, packets, etc.) may be generated by a connection monitoring module 501 at ingress and transmitted along a particular component connection, e.g., component connection 205a. The fault monitoring units may, or may not, be received at egress by a corresponding connection monitoring module 501. Based on a number of monitored units within a configurable period of time, fault detection module 503 determines if a fault exists oil the component connection. Such a process may be utilized to determine faults within either the physical or logical layer via, for example, a BFD session. In other instances, physical layer faults, e.g., LOS, LOF, E-BER, SF, etc., may be monitored by connection monitoring module 501 and, thereby, detected by fault detection module 503. It is noted that since component links may be of many different types (e.g., ethernet, SONET, etc.) connection monitoring module 501 is, in certain embodiments, configured to monitor component connections based on component connection type and component connection form, which was previously described in connection with FIG. 1D.

Based on one or more fault detections, routing module 507 is configured to implement the aforementioned placement and routing algorithms of co-pending patent application entitled, "Systems and Methods for Multi-Layer Interworking," to effectuate transparent fault recovery. In this manner, routing module 507 utilizes information stored to CTG characteristics repository 509 and/or network topology repository 511 to control the flow of traffic through optical switch section 307 of optical node 300 based on the execution of the placement and routing algorithms. According to other embodiments, CTG characteristics repository 509 may be accessed by routing module 507 for the establishment, modification, and/or termination of one or more CTGs, as well as for routing network traffic through optical switch section 307 and selecting appropriate labels to append to the optical packet headers of optical packet payloads routed via optical switch section 307.

According to certain embodiments, routing module 507 utilizes information stored to CTG characteristics repository 509 to determine whether resources (e.g., available bandwidth, priority, etc.) are available to provision network traffic onto one or more component connections (e.g., component connections 205a-205m). When a CTG does not have resources to host the traffic, notification module 505 signals surrounding network nodes to handle rerouting of the network traffic around the CTG. In particular instances, notification module 505 signals upstream label switched nodes when resources are not available for transparently routing LSP traffic onto one or more component connections of the CTG. In other embodiments, notification module 505 signals an upstream label switched node when all component connections of a CTG are "down." Signaling and rerouting may be achieved via one or more of the aforementioned signaling and routing protocols, i.e., RSVP, LDP, etc.

Accordingly, CTGs improve transport scalability by reducing the amount of information announced and, thereby, handled by singling and/or routing protocols, for the establishment and routing of one or more traffic pathways. It is noted that this reduction is accomplished by the CTG transparently performing fault detection and notification. It is contemplated, however, that fault detection and notification can still be performed externally from the CTG via conventional MPLS techniques when resources are unavailable via the CTG. Thus, as different network events (e.g., fault detections) change the physical interfaces of the component connections of a CTG, efficient fault recovery is of great importance.

Figure 6A:
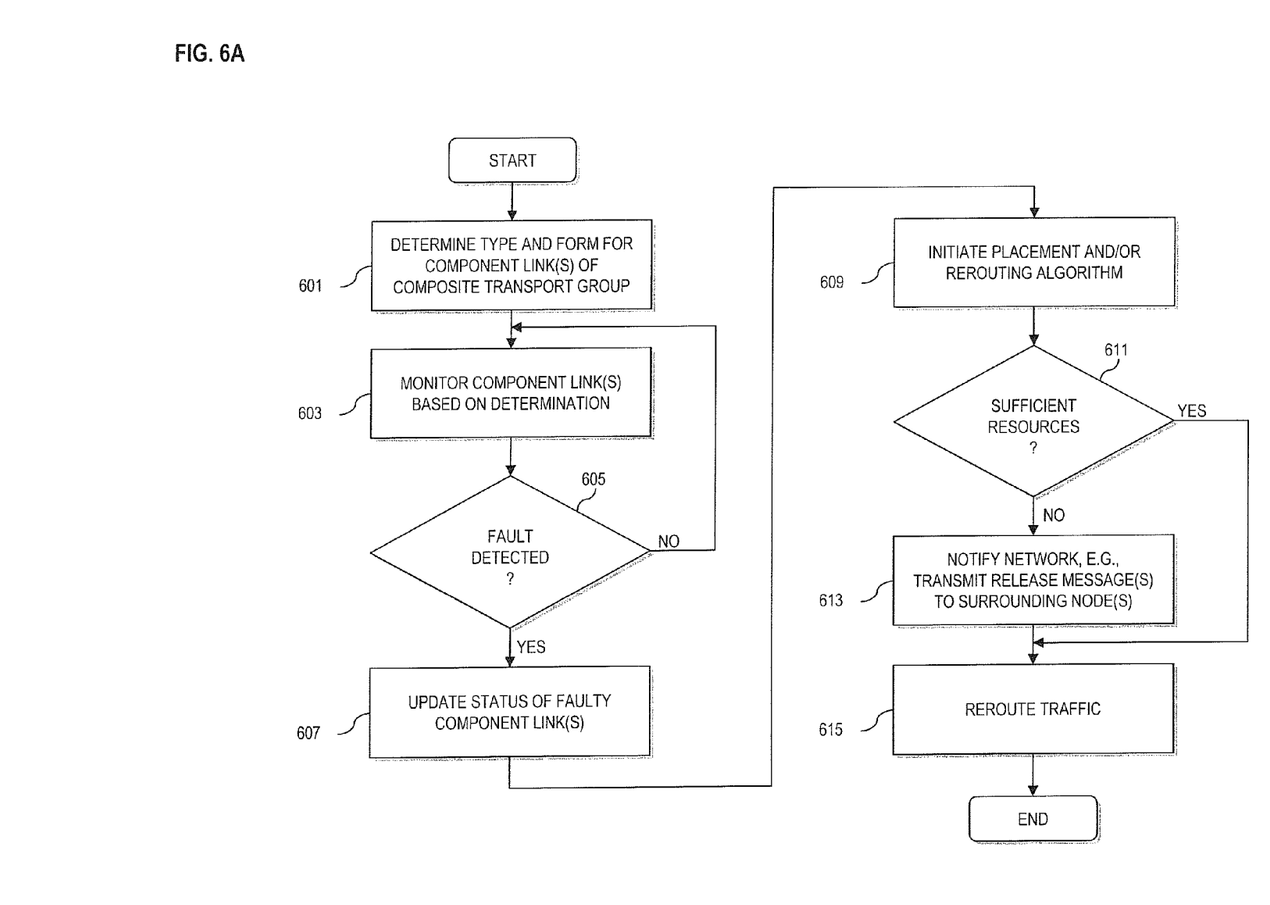
FIGS. 6A and 6B are flowcharts of processes for fault recovery of composite transport groups, according to exemplary embodiments.

FIG. 6A is a flowchart of a process for fault detection and notification for a composite transport group, according to an exemplary embodiment. For illustrative purposes, the process is described with reference to FIGS. 2 and 5. It is noted that while the process is described with reference to fault detection on a single component link, it is contemplated that the process is equally applicable to multiple component links, as well as multiple CTGs. Moreover the steps of the processes may be performed in any suitable order or combined in any suitable manner.

At step 601, connection monitoring module 501 determines a type and form for a component connection (e.g., component connection 205a) of a configured CTG (e.g., CTG 203). That is, connection monitoring module 501 determines if component connection 205a is, for example, a SONET component link, Ethernet component link, etc., as well as determines whether component link 205a is a physical link or a logical link. According to one embodiment, this determination may be performed via information extracted from CTG characteristics repository 509 and/or network topology repository 511. During step 603, connection monitoring module 501 monitors component connection 205a based on the type and form of component connection 205a, such as monitoring the state and performance of component connection 205a via one or more the aforementioned OAM protocols, i.e., by implementing mechanism 141 of FIG. 1D.

At step 605, fault detection module 503 determines whether a fault is detected based on input from connection monitoring module 501. If no fault is detected, then connection monitoring module 501 continues to monitor component connection 205a. If, however, a fault is detected then, in step 607, routing module 507 updates the status of component connection 205a to correspond to the fault within, for instance, CTG characteristics repository 509. During step 611, routing module 507 initiates internal CTG placement and/or rerouting algorithms. At step 609, routing module 507 determines whether resources (e.g., bandwidth, priority, etc.) are available on one or more of the remaining, i.e., not faulted, component connections (e.g., component connections 205b-205m) of CTG 203. If resources are not available, then notification module 505 notifies the network, per step 613. That is, notification module 505 transmits one or more release messages to surrounding nodes, such as an upstream label switching node. In exemplary embodiments, the upstream label switching node will reroute traffic from (or around) the configured CTG (e.g., CTG 203). If sufficient resources are available, then routing module 507 reroutes and places the network traffic to one or more of the remaining component connections (e.g., component connections 205b-205m) based on the internal CTG placement and rerouting algorithms, in step 615.

Figure 6B:
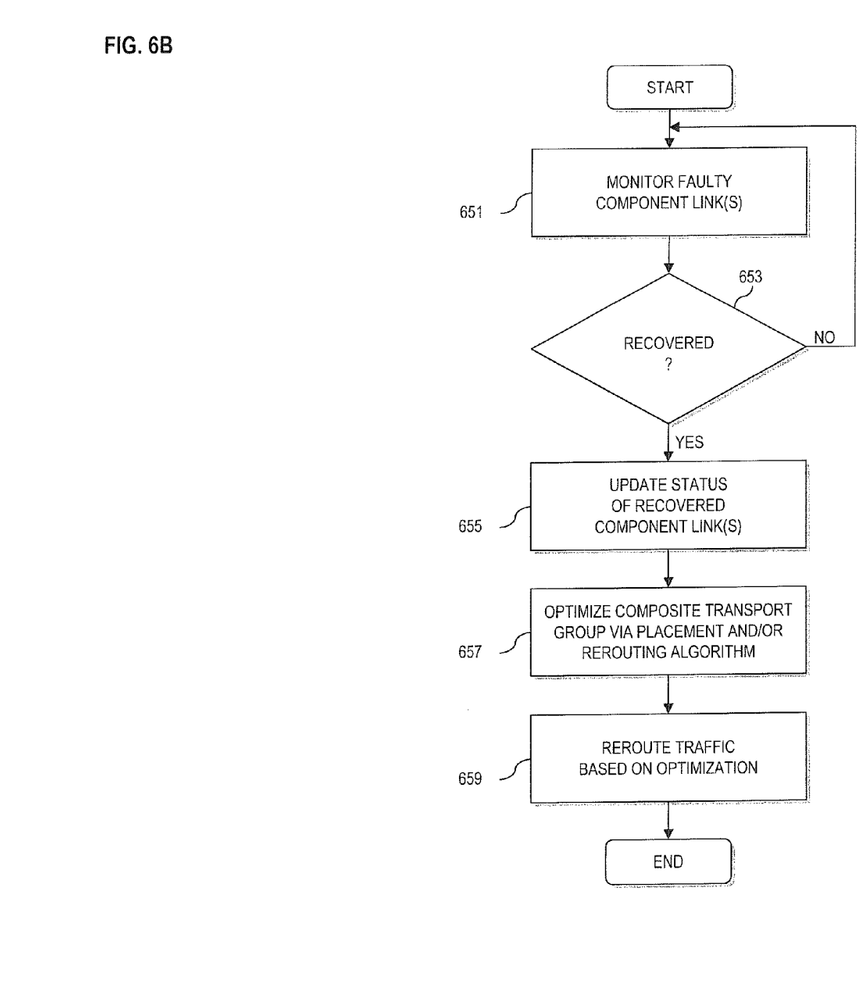

FIG. 6B is a flowchart of a process for rerouting network traffic based on fault recovery of a component connection, according to an exemplary embodiment. At step 651, connection monitoring module monitors the status of a "previously" faulted component link (e.g., component connection 205a). During step 653, fault detection module 503 determines whether component connection 205a has recovered from a detected fault. If component link 205a has not recovered, then connection monitoring module 501 continues to monitor component link 205a. If component link 205a has recovered, then, in step 655, routing module 507 updates a status of component link 205a. At step 657, routing module 507 optimizes the provisioning of traffic via the placement and/or routing algorithms. Based on optimization, routing module 507 reroutes the network traffic over the configured CTG (e.g., CTG 203), per step 659.

The processes described herein for fault detection and notification for composite transport groups may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
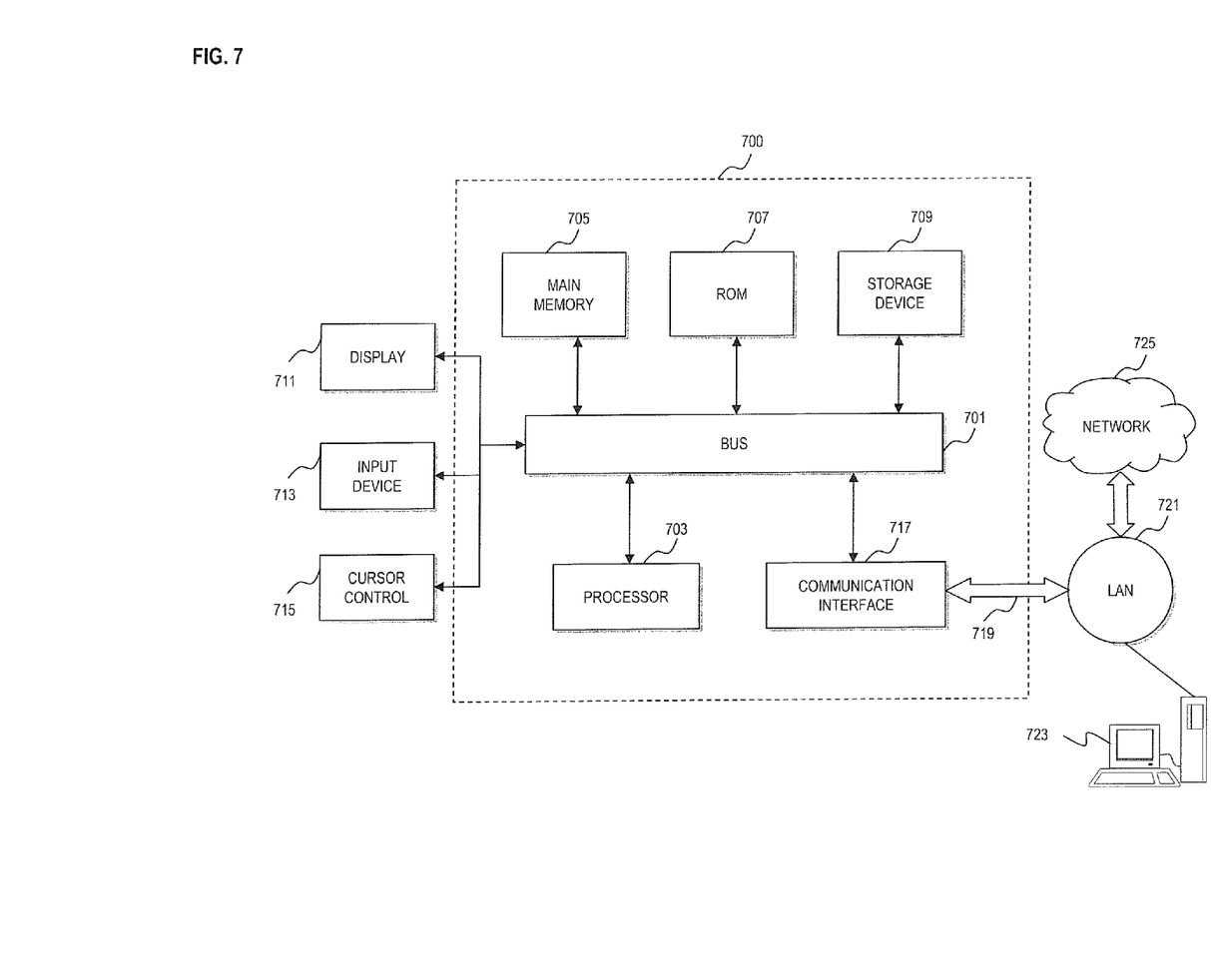
FIG. 7 is a diagram of a computer system that can be used to implement various exemplary embodiments.

FIG. 7 illustrates computing hardware (e.g., computer system) 700 upon which an embodiment according to the invention can be implemented. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (TR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A computer-implemented method comprising the following steps:
    monitoring, by one or more processors, a component link of a composite transport group associated with a label switched path established with an upstream label switched node;
    detecting a fault in the component link internally within the composite transport group without notifying the upstream label switched node, wherein the composite transport group provides a bundling of physical and/or logical component links representing a single logical interface; and
    determining whether traffic of the label switched path can be transparently rerouted to another component link of the composite transport group based on resource availability of the other component link and without externally notifying the upstream label switched node,
    wherein, if resources are available, the traffic is transparently rerouted to the other component link without externally notifying the upstream label switched node; and
    if resources are unavailable, the upstream label switched node is notified and reroutes the traffic from the composite transport group.

2. A computer-implemented method according to claim 1, wherein the upstream label switched node is an upstream label switched node closest to the fault or an ingress label switched node of the label switched path.

3. A computer-implemented method according to claim 1, wherein monitoring includes
    tracking liveliness of the component link, the liveliness corresponding to operational two-way communication between ingress and egress of the component link.

4. A computer-implemented method according to claim 3, wherein liveliness is tracked via a bidirectional forwarding detection session.

5. A computer-implemented method according to claim 1, wherein monitoring includes determining a type and form for the component link, the type specifying technology utilized and the form specifying either a logical link or a physical link.

6. A computer-implemented method according to claim 5, wherein the type of component link relates to a synchronous optical networking component link or an ethernet component link.

7. A computer-implemented method according to claim 1, wherein the fault is either a loss of signal or a signal failure.

8. A computer-implemented method according to claim 1, wherein the composite transport group is treated as a single traffic engineering pathway by the upstream label switched node.

9. A computer-implemented method according to claim 1, wherein the composite transport group provide individual operations administration maintenance (OAM) functionality for each of the component links.

10. An apparatus comprising:
    a monitoring module configured to monitor a component link of a composite transport group associated with a label switched path established with an upstream label switched node;
    a fault detection module configured to detect a fault in the component link internally within the composite transport without notifying the upstream label switched node, wherein the composite transport group provides a bundling of physical and/or logical component links representing a single logical interface; and a routing module configured to determine whether traffic of the label switched path can be transparently rerouted to another component link of the composite transport group based on resource availability of the other component link and without externally notifying the upstream label switched node, wherein, if resources are available, the routing module transparently reroutes the traffic to the other component link without externally notifying the upstream label switched node; and if resources are unavailable, the upstream label switched node is notified and reroutes the traffic from the composite transport group.

11. An apparatus according to claim 10, wherein the upstream label switched node is an upstream label switched node closest to the fault or an ingress label switched node of the label switched path.

12. An apparatus according to claim 10, wherein monitoring the component link includes:

tracking liveliness of the component link, the liveliness corresponding to operational two-way communication between ingress and egress of the component link.

13. An apparatus according to claim 12, wherein liveliness is tracked via a bidirectional forwarding detection session.

14. An apparatus according to claim 10, wherein detection is based on a type and form of the component link, the type specifying technology utilized and the form specifying either a logical link or a physical link.

15. An apparatus according to claim 14, wherein the type of component link relates to a synchronous optical networking component link or an ethernet component link.

16. An apparatus according to claim 10, wherein the fault is either a loss of signal or a signal failure.

17. A system comprising:

one or more optical nodes configured to monitor a component link of a composite transport group associated with a label switched path, to detect a fault in the component link internally within the composite transport without notifying the upstream label switched node, wherein the composite transport group provides a bundling of physical and/or logical component links representing a single logical interface, wherein the one or more optical nodes are further configured to determine whether traffic of the label switched path can be transparently rerouted to another component link of the composite transport group based on resource availability of the other component link and without externally notifying the upstream label switched node, wherein, if resources are available, the traffic is transparently rerouted to the other component link without externally notifying the upstream label switched node; and if resources are unavailable, the upstream label switched node is notified and reroutes the traffic from the composite transport group.

18. A system according to claim 17, wherein monitoring the component link includes:

tracking liveliness of the component link via a bidirectional forwarding detection session established along the component link, the liveliness corresponding to operational two-way communication between ingress and egress of the component link.

19. A system according to claim 17, wherein the fault is either a loss of signal or a signal failure.

20. A system according to claim 17, wherein the optical node includes an optical add/drop multiplexer.

* * * * *